US011644277B2

(12) United States Patent
Szapiel et al.

(10) Patent No.: US 11,644,277 B2
(45) Date of Patent: May 9, 2023

(54) DIGITAL BOOSTER FOR SIGHTS

(71) Applicant: RAYTHEON CANADA LIMITED, Ottawa (CA)

(72) Inventors: Stan Szapiel, Midland (CA); Kevin Burgess Wagner, Midland (CA); Michael Thorpe, Midland (CA)

(73) Assignee: RAYTHEON CANADA LIMITED, Ottowa (CA)

( * ) Notice: Subject to any disclaimer, the term of this patent is extended or adjusted under 35 U.S.C. 154(b) by 0 days.

(21) Appl. No.: 17/741,122

(22) Filed: May 10, 2022

(65) Prior Publication Data
US 2023/0003485 A1 Jan. 5, 2023

Related U.S. Application Data

(60) Provisional application No. 63/217,412, filed on Jul. 1, 2021.

(51) Int. Cl.
*F41G 1/38* (2006.01)
*H04N 5/262* (2006.01)
*H04N 5/272* (2006.01)
*H04N 23/69* (2023.01)
*G02B 27/32* (2006.01)
*G02B 23/16* (2006.01)

(52) U.S. Cl.
CPC ............. *F41G 1/38* (2013.01); *H04N 5/2628* (2013.01); *H04N 5/272* (2013.01); *H04N 23/69* (2023.01); *G02B 23/16* (2013.01); *G02B 27/32* (2013.01)

(58) Field of Classification Search
CPC ........ F41G 1/38; H04N 5/2628; H04N 5/272; H04N 23/69; H04N 23/11; G02B 23/16; G02B 27/32; G02B 23/12; G06T 5/00
See application file for complete search history.

(56) References Cited

U.S. PATENT DOCUMENTS

| 9,069,172 | B1 * | 6/2015 | Morley | ................... | H01J 31/49 |
| 9,113,061 | B1 * | 8/2015 | Morley | ................... | H04N 23/69 |
| 10,345,587 | B1 | 7/2019 | Loebig et al. | | |
| 2008/0022575 | A1 * | 1/2008 | Drexler | .................... | F41G 1/38 |
| | | | | | 42/111 |
| 2008/0204361 | A1 * | 8/2008 | Scales | .................... | H04N 5/265 |
| | | | | | 345/8 |
| 2011/0088540 | A1 | 4/2011 | Brittingham et al. | | |
| 2012/0117848 | A1 * | 5/2012 | Cox | ......................... | F41G 1/38 |
| | | | | | 42/130 |

(Continued)

FOREIGN PATENT DOCUMENTS

WO 2021119154 A1 6/2021

OTHER PUBLICATIONS

International Search Report and Written Opinion in Application No. PCT/CA2022/051048 dated Sep. 27, 2022 (9 pgs.).

*Primary Examiner* — Chiawei Chen
(74) *Attorney, Agent, or Firm* — Burns & Levinson, LLP; Joseph M. Maraia

(57) ABSTRACT

A digital booster for an optical system includes an image acquisition unit. The image acquisition unit is configured to acquire an image frame from a non-magnified optic. The image frame includes an aiming reticle imposed by the non-magnified optic. The digital booster includes a display and a processor. The processor is configured to locate the aiming reticle on the image frame, select a sub-frame of the image frame with an aspect ratio that is centered on the aiming reticle of the image frame, perform image inversion and rescaling of the sub-frame, and transmit the sub-frame to the display.

20 Claims, 12 Drawing Sheets

(56) References Cited

U.S. PATENT DOCUMENTS

| | | | |
|---|---|---|---|
| 2012/0167439 A1* | 7/2012 | Jock | F41G 3/165 |
| | | | 42/130 |
| 2012/0314283 A1* | 12/2012 | Jahromi | G02B 23/145 |
| | | | 359/422 |
| 2016/0061568 A1 | 3/2016 | Crispin | |
| 2016/0069645 A1 | 3/2016 | Magi et al. | |
| 2020/0014832 A1 | 1/2020 | Kunishige et al. | |
| 2020/0049455 A1 | 2/2020 | Hamilton et al. | |
| 2020/0284551 A1* | 9/2020 | Brown | G01S 17/08 |
| 2022/0404121 A1* | 12/2022 | Loebig | F41G 1/17 |

* cited by examiner

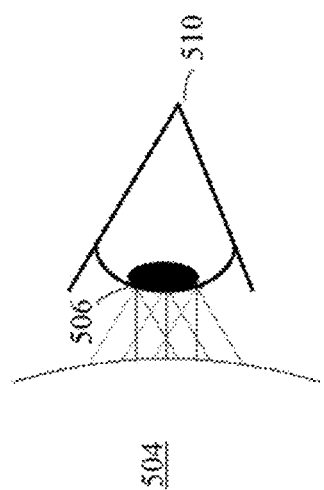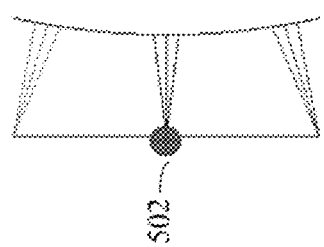
FIG. 5B
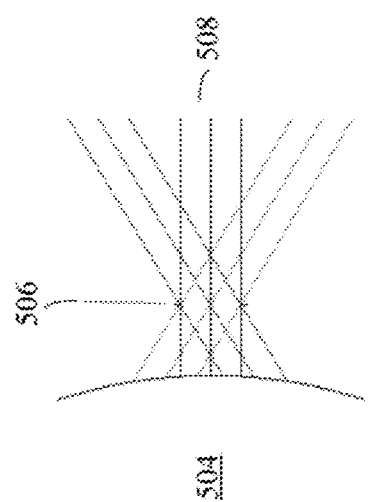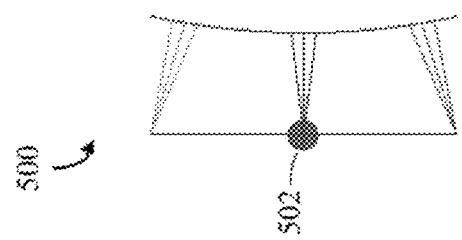
FIG. 5A

DIGITAL BOOSTER FOR SIGHTS

CROSS-REFERENCE TO RELATED APPLICATIONS

The present application claims the benefit of provisional application No. 63/217,412, filed Jul. 1, 2021, the entire contents of which is incorporated herein by reference.

TECHNICAL FIELD

The subject disclosure relates to viewing optics, and more particularly to digital boosters for optics.

BACKGROUND

When aiming a visual optical instrument such as a telescopic sight in a firearm, a rifle scope, or the like, optical systems employed therein can use a magnification device, combined with a non-magnified optic and reticle to improve accuracy. Non-magnified optics are optics with unity magnification (1.0×). In this regard, while using a non-magnified optic, it appears as though the user is viewing a target with the naked eye. Some non-magnified optics include optoelectronic components, having the capability to reflect or impose a reticle from a light-emitting diode, a hologram, or one or more lasers onto a lens inside the optic. Reticles may include a pattern of lines and/or markings, and in most cases enable user target acquisition.

Non-magnified optics are deficient in some respects. For example, a non-magnified image is perfect for shooting with both eyes open, but the lack of magnification built within hinders performance at larger distances. Operation of conventional non-magnified optics with visible (VIS) spectral band capabilities only hinders performance in poor light, rain, fog, and snow. Reticle patterns used in non-magnified optics such as a red dot sight reflected or projected into an optic may be rather poorly defined, may partially or even completely obstruct some smaller targets at larger distances, and both the reticle's perceived size and level of coherent noise, such as red speckle, depend on source power settings. Reticle patterns are also very limited, typically a red dot or red dot plus ring, and are not interchangeable within the same optic.

Conventional flip-in telescopic magnifiers, used in succession with a non-magnified optic, magnify a scene, improving performance at larger distances, though they also magnify the reticle size. This further reduces aiming precision, a key reason why flip-in telescopic magnifiers are limited in magnification by typically 3×. Unlike non-magnified sights, flip-in telescopic magnifiers have a small exit pupil, a restricted eyebox, and restricted eye relief. Flip-in telescopic magnifiers require optomechanical reticle adjustment and internal zeroing mechanisms or internal calibration. In general, the optical axis on which a telescopic magnifier lies may not be parallel to a collimated beam providing the reticle pattern on the non-magnified optic, yielding off-center reticle patterns. Flip-in telescopic magnifiers require optical image inverters such as a prism cluster, typically a Schmidt-Pechan prism, and require flip-in-and-out operation. In all, flip-in telescopic magnifiers require complex mechanics, a need for a field-of-view (FOV) margin, a time margin to flip-in-and-out, and oversized optics, thus increasing costs, size, and weight.

SUMMARY OF THE TECHNOLOGY

In at least one aspect, the application describes a digital booster for an optical system, capable of acquiring an image frame from a non-magnified optic. When the non-magnified optic position is not parallel to a collimated beam providing a reticle on the non-magnified optic, a digital booster can locate the reticle projected by the non-magnified optic and center the reticle on a digital display. This is completed by an internal processor which selects of sub-frame of the non-magnified optic image frame and centers the reticle thereon.

An example digital booster for an optical system includes an image acquisition unit. The image acquisition unit is configured to acquire an image frame from a non-magnified optic. The image frame includes an aiming reticle imposed by the non-magnified optic. The digital booster includes a display and a processor. The processor is configured to locate the aiming reticle on the image frame, select a sub-frame of the image frame with an aspect ratio that is centered on the aiming reticle of the image frame, perform image inversion and rescaling of the sub-frame, and transmit the sub-frame to the display.

The digital booster may include a database of electronic reticle patterns, wherein the processor is further configured to select an electronic aiming reticle from the database and impose the electronic aiming reticle onto the sub-frame. The digital booster may include a monocular housing in which the image acquisition unit, display, and processor are disposed within. The digital booster may include multiband zoom optics disposed between the image acquisition unit and the non-magnified optic. The digital booster may include a multiband focal plane array in electronic communication with the image acquisition unit to enable the image acquisition unit to acquire the image frame in one or more of the following electromagnetic bands: visible, near infrared, and short-wave infrared.

The processor may be configured to turn off the aiming reticle imposed by the non-magnified optic after locating the aiming reticle on the image frame. The processor may be further configured to select a sub-frame based on having a maximum area sub-frame and based on attributes of the display. The image acquisition unit may be configured to magnify the image frame or sub-frame such as to provide zooming capability.

The digital booster may be adapted to function within one or more of the following apparatuses: a firearm, a cell phone, telescope, microscope, or medical imaging device.

An example method for centering an aiming reticle includes acquiring, from an image acquisition unit, an image frame from a non-magnified optic. The image frame includes an aiming reticle imposed by the non-magnified optic. The example method includes locating, with a processor, the aiming reticle on the image frame. The example method includes selecting, with the processor, a sub-frame of the image frame with an aspect ratio that is centered on the aiming reticle of the image frame. The example method includes performing, with the processor, image inversion and rescaling of the sub-frame. The example method includes displaying the sub-frame.

The example method may include selecting an electronic aiming reticle from a database and imposing the electronic aiming reticle onto the sub-frame. The example method may include employing a multiband focal plane array and multiband zoom optics to enable the image acquisition unit to acquire the image frame in one or more of the following electromagnetic bands: visible, near infrared, and short wave infrared. The example method may include turning off, with the processor, the aiming reticle imposed by the non-magnified optic after locating the aiming reticle on the image frame. The example method may include magnifying the image frame or sub-frame such as to provide zooming capability.

Selecting, with the processor, a sub-frame of the image frame may be based on attributes of display. Selecting, with the processor, a sub-frame of the image frame may be based on maximizing the area of the sub-frame.

The example method may include checking the location of the aiming reticle on the image frame by turning on, with the processor, the aiming reticle imposed by the non-magnified optic, and repeating the locating of the aiming reticle on the image frame. The example method may include generating a perturbed reticle onto the sub-frame. The example method may include operating the image acquisition unit and the processor within one or more of the follow apparatuses: a firearm, a cell phone, telescope, microscope, or medical imaging device.

An example digital booster for a firearm includes a monocular housing defined by a flat-field eyepiece, the monocular housing configured to rotate in alignment with a non-magnified optic and a trajectory of the firearm. The example digital booster includes an image acquisition unit disposed within the monocular housing. The image acquisition unit is configured to acquire an image frame from the non-magnified optic. The image frame includes an aiming reticle imposed by the non-magnified optic. The example digital booster includes a display situated adjacent the flat-field eyepiece within the monocular housing. The example digital booster includes a processor disposed within the monocular housing. The processor is configured to locate the aiming reticle on the image frame. The processor is configured to select a sub-frame of the image frame with an aspect ratio that is centered on the aiming reticle of the image frame. The processor is configured to perform image inversion and rescaling of the sub-frame. The processor is configured to transmit the sub-frame to the display.

BRIEF DESCRIPTION OF THE DRAWINGS

FIG. 5A and FIG. 5B show a conventional eyepiece diagram for visual optical instruments that have a reticle pattern and exit pupil.

DETAILED DESCRIPTION

The subject technology addresses deficiencies and shortcomings associated with conventional non-magnified red dot and reflex sights, holographic sights, and flip-in telescopic magnifiers. The application includes exemplary devices, systems, and methods for a digital booster to be used with a non-magnified optic.

Figure 1:
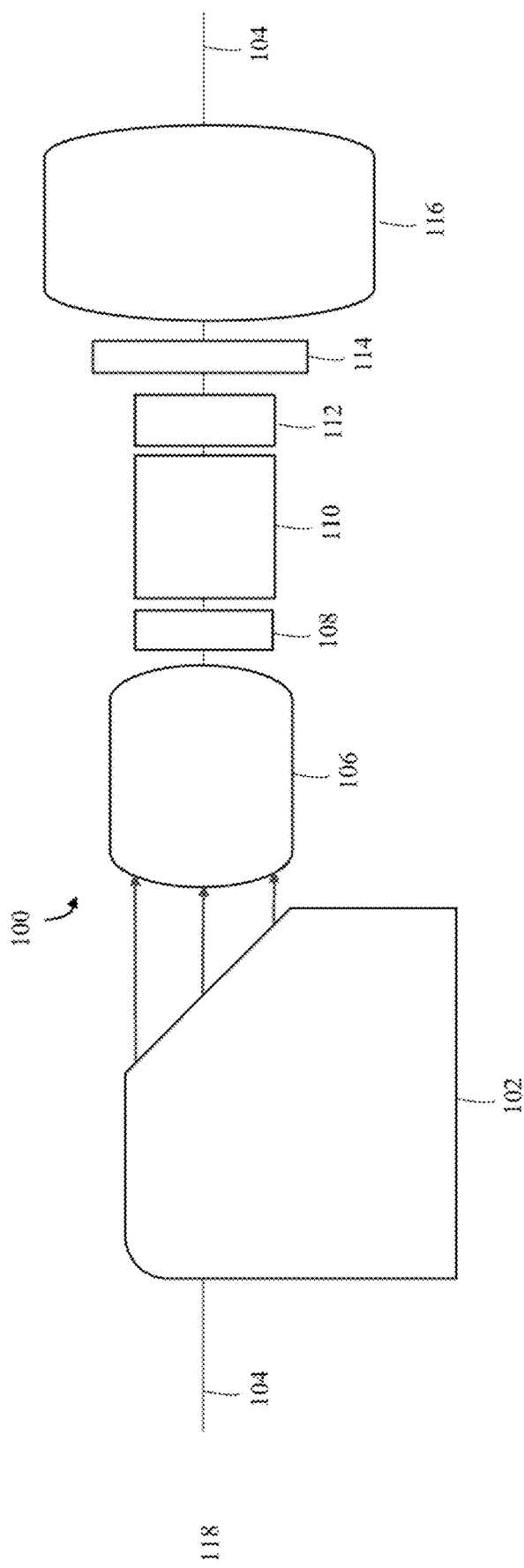
FIG. 1 is a block diagram of a non-magnified optic and a digital booster along an optical axis.

FIG. 1 shows a block diagram including a digital booster 100 used in conjunction with a non-magnified optic 102. In some implementations, the digital booster 100 and components therein may be disposed between the non-magnified optic 102 and a user, such that the digital booster 100 receives light from the non-magnified optic 102 along the optical axis 104. In other implementations, the digital booster 100 may be disposed between the non-magnified optic 102 and the target 118 along the optical axis 104 such that light from the target is processed by the digital booster 100 and received thereafter by the non-magnified optic 102.

The non-magnified optic 102 may include several implementations of a sight providing 1× magnification. The non-magnified optic 102 may include a reticle, such as an aiming reticle, which may be turned on or off. For example, non-magnified optic 102 may include a red-dot sight. In some implementations, the non-magnified optic 102 may include a collimator to collimate light beams emanating from a light source such as a light emitting diode (LED). The collimator reflects light beams to collimate them as collimated light beams. In operation, light beams from the LED pass through a front surface of a glass element within the non-magnified optic 102 and reach a middle surface of the glass element. A dichroic reflective coating of the middle surface reflects light beams from the LED to form collimated light beams. This is because the dichroic reflection coating on the middle surface reflects a narrow spectral band of light matching that of LED light beams to form the collimated light beams. The collimated light beams reflect from the middle surface back through the front surface of the front surface of the glass element. Any other light including a wavelength different than the LED passes through collimator with little attenuation. As a result, a user will see a reticle at infinity and a target scene with minimal distortion and attenuation.

For example, the non-magnified optic 102 may include a reflex sight. In some implementations, the non-magnified optic 102 may utilize an illuminated reticle and a lens that collimates every point of the reticle to project the reticle pattern to a target plane. A partially reflecting mirror or beam combiner may be located downstream of the collimating lens to superimpose the reticle pattern over the real-world scene.

For example, the non-magnified optic 102 may include a holographic sight. In some implementations, the non-magnified optic 102 may include a hologram of a reticle pattern, a laser diode light source to illuminate the hologram and collimator interposed in a path of a light beam projected by the light source for collimating the light beam. In light of the foregoing, non-magnified optic 102 may include several other implementations of a sight providing 1× magnification with a reticle.

In some implementations, the digital booster 100 may include a monocular housing such as a scope, defined by an eyepiece 116. The monocular housing may be configured to rotate in alignment with the non-magnified optic 112, where both the monocular housing and the non-magnified optic are mounted on a firearm. The monocular housing, in this regard, may include flip-in and flip-out capability.

The digital booster 100 includes several electro-optical components and modules including, but not limited to, multiband zoom optics 106, a multiband focal plane array 108, an image acquisition unit 110, a processor 112, a display 114, and an eyepiece 116. Each one of the components included within the digital booster 100 may be aligned in series or in parallel. Each one of the components included within the digital booster 100 may also be combined with one another to operate on a singular module. For example, processor 112 and image acquisition 110 may operate within a singular module such as an image acquisition and processing module. For example, processor 112, image acquisition 110, and display 114 may operate within a singular module. For example, multiband focal plane array 108, processor 112, image acquisition 110, and display 114 may operate within a singular module. For example, multiband zoom optics 106 and multiband focal plane array 108 may operate within a singular module, and so on.

Still referring to FIG. 1, the multiband zoom optics 106 may include an optical lens system that can focus light of multiple wavelengths. In one implementation, the multiband zoom optics 106 may include optics that can focus a first wavelength band of radiation, a second wavelength band of radiation, and a third wavelength band of radiation on a common focal plane. The multiband zoom optics 106 may include a first, second, and third optical lenses or lens regions that respectively transmit and/or focus three separate wavelength bands of radiation. The multiband zoom optics 106 may include an additional lens or lens region that focuses or transmits a common focal plane. As such, the multiband zoom optics 106 may be configured to transmit and focus at least a portion of the visible spectrum, the near-infrared spectrum, and/or the short-wave infrared spectrum. The focal length of each lens or lens region of multiband zoom optics 106 may include any band or portion of the electromagnetic spectrum. In some implementations, the focal length of each lens or lens region of the multiband zoom optics 106 may be variable or fixed, the focal length including ranges from 5 mm to 200 mm.

The multiband zoom optics 106 may be paired with a focal plane array 108, both arranged along the optical axis 104. The focal plane array 108 may include a sensor array such as a visible detector, a near-infrared detector, and/or a short-wave infrared detector and combinations thereof aligned on one or more substrates. The focal plane array 108 architecture may be operative to detect light in the range of visible, near-infrared, and/or short-wave infrared wavelengths incident on the surface of the one or more substrates on which the visible detector, the near-infrared detector, and/or the short-wave infrared detector are formed. The focal plane array 108 may be in electrical communication with the processor 112 and the image acquisition unit 110.

The image acquisition unit 110 and processor 112 may also be disposed along the optical axis 104. The image acquisition unit 110 may include an aperture to allow light in, and a digital sensor to capture photons in the visible, near-infrared, and/or short-wave infrared spectrum. The image acquisition unit 110 may be configured to acquire an image frame from the non-magnified optic 102 such that light emitted by the target 118 passes along the optical axis, through the non-magnified optic 102, and to the image acquisition unit 110. The image acquisition unit 110 may include zooming functions such as to magnify an image frame. The image acquisition unit 110 may include a camera, video camera, and implementations thereof.

In some implementations, an image frame acquired by the image acquisition unit 110 may include the aiming reticle imposed by the non-magnified optic 102. Thus, the image frame may include an image of the target 118 and an aiming reticle overlayed or superimposed thereover. Because the aiming reticle may include lines, dots, posts, circles, scales, chevrons, combinations thereof, and other indicators, the image frame consequently may include an image of the target 118 and lines, dots, posts, circles, scales, chevrons, combinations thereof, and other indicators overlayed or superimposed over the image of the target 118. The image frame may include wire crosshairs, etched reticles, illuminated reticles, and graticules because of the inclusion of the aiming reticle.

The processor 112 may be configured to receive the image itself or data related to the image frame from the image acquisition unit 110. The processor 112 may be configured to locate the aiming reticle on the image frame, explained in more detail with reference to FIGS. 2 and 3. The processor 112 may be configured to transmit the image frame, a sub-frame of the image frame, or data related to the image frame or a sub-frame of the image frame to a display 114. An eyepiece 116 such as a flatfield eyepiece may be aligned adjacent to the display 114 to allow a user to view the display 114.

Figure 2:
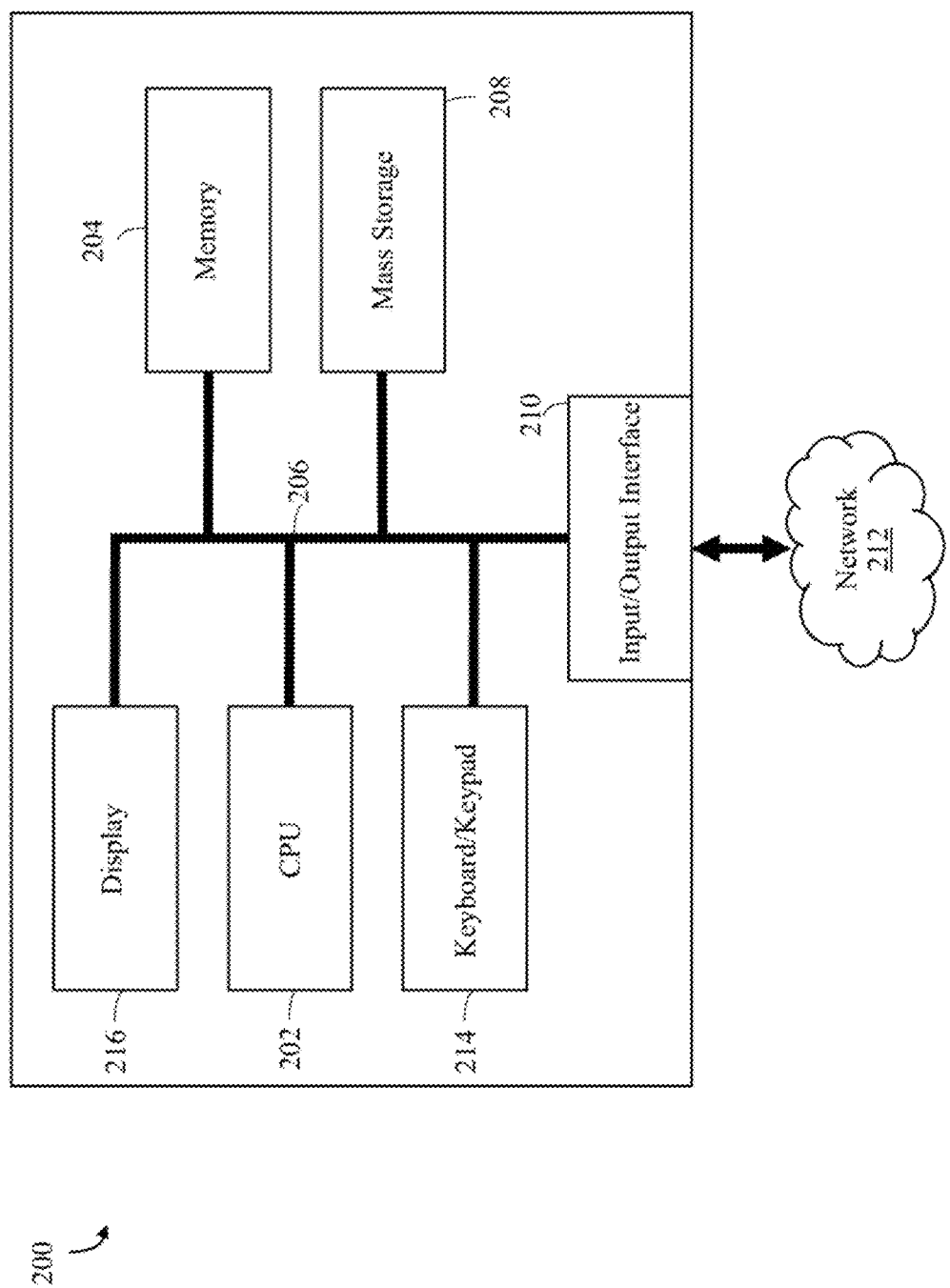
FIG. 2 is a block diagram of a computer system arranged to perform processing associated with the digital booster of FIG. 1.
Figure 3:
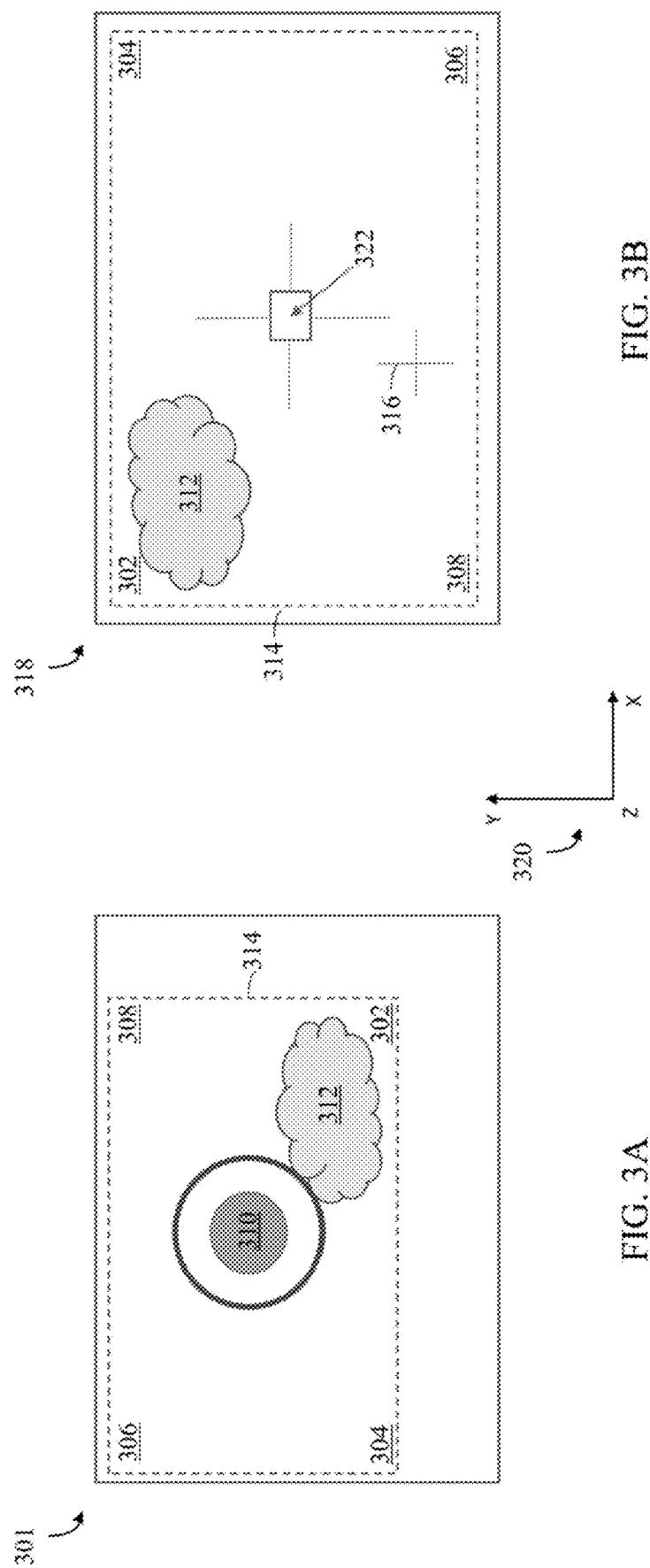
FIGS. 3A-3B show an implementation of image frame processing by the digital booster of FIG. 1.

FIG. 2 is block diagram of a computer system 200 arranged to perform processing associated with the digital booster 100. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of a digital booster 100. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card, or any other suitable data communications device. To provide the functions of a processor according to FIG. 1, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing related to, for example, a common operational picture (COP). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include a digital booster such as described with respect to FIGS. 1, 3, 4, 6, and 7.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as waveform control, streaming cross-correlations, artifact corrections, target acquisitions, and the tracking and discrimination of targets. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. Certain embedded systems, real-time computing, and low-level programming languages may also be employed. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with digital booster 100, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the digital booster 100 includes a network-based, e.g., Internet-based, application that may be configured and run on the system 200 and/or any combination of the other components of the digital booster 100. The computer system 200 may include a web server running a Web 2.0 application or the like. Web applications running on the digital booster 100 may use server-side dynamic content generation mechanisms such, without limitation, Java servlets, CGI, PHP, or ASP. In certain implementations, mashed content may be generated by a web browser running, for example, client-side scripting including, without limitation, JavaScript and/or applets on a wireless device.

In certain implementations, the digital booster 100 or computer system 200 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The digital booster 100, computer system 200, or another component of digital booster 100 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

FIG. 3A shows an image frame 301 transmitted by the image acquisition unit 110 to the processor 112. The image frame 301 may include a horizontal X-axis and a vertical Y-axis relative coordinate system 320. For example, the image frame 301 includes an X:Y aspect ratio, or a ratio of the width of the image frame 301 to the height of the image frame 301. Some common X:Y aspect ratios of image frame 301 may include, but are not limited to 1:1, 16:9, 16:10, 9:16, 1.85:1, 2:1, 2.35:1, 2.39:1, and 4:3.

A center point of the image frame 301 includes an X-axis and Y-axis coordinate. For example, where the image frame 301 includes a horizontal X-axis of 1.0 units of length and a vertical Y-axis of 1.0 units of length, the center point of the image frame 301 may be located at 0.5 units along the horizontal X-axis and 0.5 units along the vertical Y-axis.

The image frame may also include an aiming reticle 310 imposed by the non-magnified optic 102 as mentioned prior. Relative coordinate system 320, the aiming reticle 310 may be located distant, proximate, or on the center point of the image frame 301. In the example mentioned above, the aiming reticle 310 may be located at the center point of the image frame 301, at 0.5 units along the horizontal X-axis and 0.5 units along the vertical Y-axis. In another example, the aiming reticle 310 may be off-center, located at 0.4 units along the horizontal X-axis and 0.6 units along the vertical Y-axis.

The processor 112 is configured to locate the aiming reticle 310 position on the image frame 301, and the image frame 301 center. For example, by locating the aiming reticle 310, the processor 112 is configured to predict, compute, sense, or otherwise determine a two-dimensional or three-dimensional coordinates resembling one or more features of the aiming reticle 310 on the image frame 301, such as lines, dots, posts, circles, scales, chevrons, combinations thereof, and other indicators. For example, in the case of when an aiming reticle 310 includes more than a dot imposed by the non-magnified optic 102 within the image frame 301, processor 112 is configured to predict, compute, sense, or otherwise determine several two-dimensional or three-dimensional coordinates resembling one or more features of the aiming reticle 310 on the image frame 301, such as lines, dots, posts, circles, scales, chevrons, combinations thereof, and other indicators. In the implementation shown in FIG. 3A, processor 112 is configured to locate all features of the aiming reticle 310, including a ring and a circle as well as the center point of the image frame 301. The processor 112 may thereafter turn off the aiming reticle 310 imposed by the non-magnified optic 102.

The processor 112 may determine if the aiming reticle 310 is centered at the center point of the image frame 301. This may be completed in some implementations by comparing the coordinates of the aiming reticle 310 with the coordinates of the center of the image frame 301. In the case where the aiming reticle 310 is not centered at the center point of the image frame 301, processor 112 may select a sub-frame 314 of the image frame 301 with a sub-frame aspect ratio that is centered on the aiming reticle 310 of the image frame 301. The sub-frame 314 may be selected by the processor 112 to effectively crop the image frame 301 such that the aiming reticle 310 imposed by the non-magnified optic 102 is thereafter centered within the sub-frame 314. For example, a sub-frame 314 is a portion of image frame 301 and includes corners 302, 304, 306, 308.

The aspect ratio of the sub-frame 314 selected by the processor 112 is dependent on the position of the aiming reticle 310. In some implementations, the aspect ratio of the sub-frame 314 selected by the processor 112 is dependent on selecting a maximum area sub-frame 314 that is centered on the aiming reticle 310. In some implementations, the aspect ratio of the sub-frame 314 selected by the processor 112 is dependent on attributes of the display 114.

Once the processor selects a sub-frame 314 and centers the aiming reticle 310 therein, the processor 112 may be configured to perform image inversion of the sub-frame 314. Image inversion includes rotating the sub-frame 314. For example, corners 302, 304, 306, and 308 may be rotated roughly 180° from the positions shown in FIG. 3A to the positions shown in FIG. 3B. For example, target attribute 312 may be rotated roughly 180° from the position shown in FIG. 3A to the position shown in FIG. 3B.

Once the processor selects a sub-frame 314 and centers the aiming reticle 310 therein, the processor 112 may also be configured to rescale the sub-frame 314. For example, the distance between corners 302, 304, 306, and 308 may be increased by a linear or exponential factor. For example, sub-frame 314 may increase in size, including the contents of the sub-frame, such as the target attribute 312. For example, sub-frame 314 may increase in size rationally or irrationally. For example, sub-frame 314 may increase in size from the size of sub-frame 314 in FIG. 3A to the size of sub-frame 314 in FIG. 3B. In some implementations sub-frame 314 may be decreased in size by the processor 112. Rescaling may depend on attributes of the display 114.

The aiming reticle 310 imposed by the non-magnified optic 102 may be turned off either before or after image inversion and or the rescaling process. In some implementations, the processor 112 is configured to turn off the aiming reticle imposed by the non-magnified optic 102. In other implementations, the aiming reticle 310 may be manually turned off. The processor 112 may periodically turn on the aiming reticle 310 to repeat the process of locating the aiming reticle 310, selecting a sub-frame 314, performing image inversion and rescaling, and transmitting the sub-frame 314 to the display 114. This process act as an internal zeroing mechanism.

The digital booster 100 may include a database of electronic reticle patterns. The processor 112 may be configured to select an electronic aiming reticle 322 from the database and impose the electronic aiming reticle 322 onto the sub-frame 314, offering an interchangeable and customizable electronic aiming reticle 322 based on data within the database. The processor 112 may be configured to also impose a perturbed reticle 316 onto the sub-frame 314 when rangefinder data and ballistic data are known.

The processor 112 may be configured to thereafter transmit the image frame, a sub-frame of the image frame, or data related to the image frame or a sub-frame of the image frame to a display 114, including or excluding the electronic aiming reticle 322 and/or perturbed reticle 316.

Figure 4:
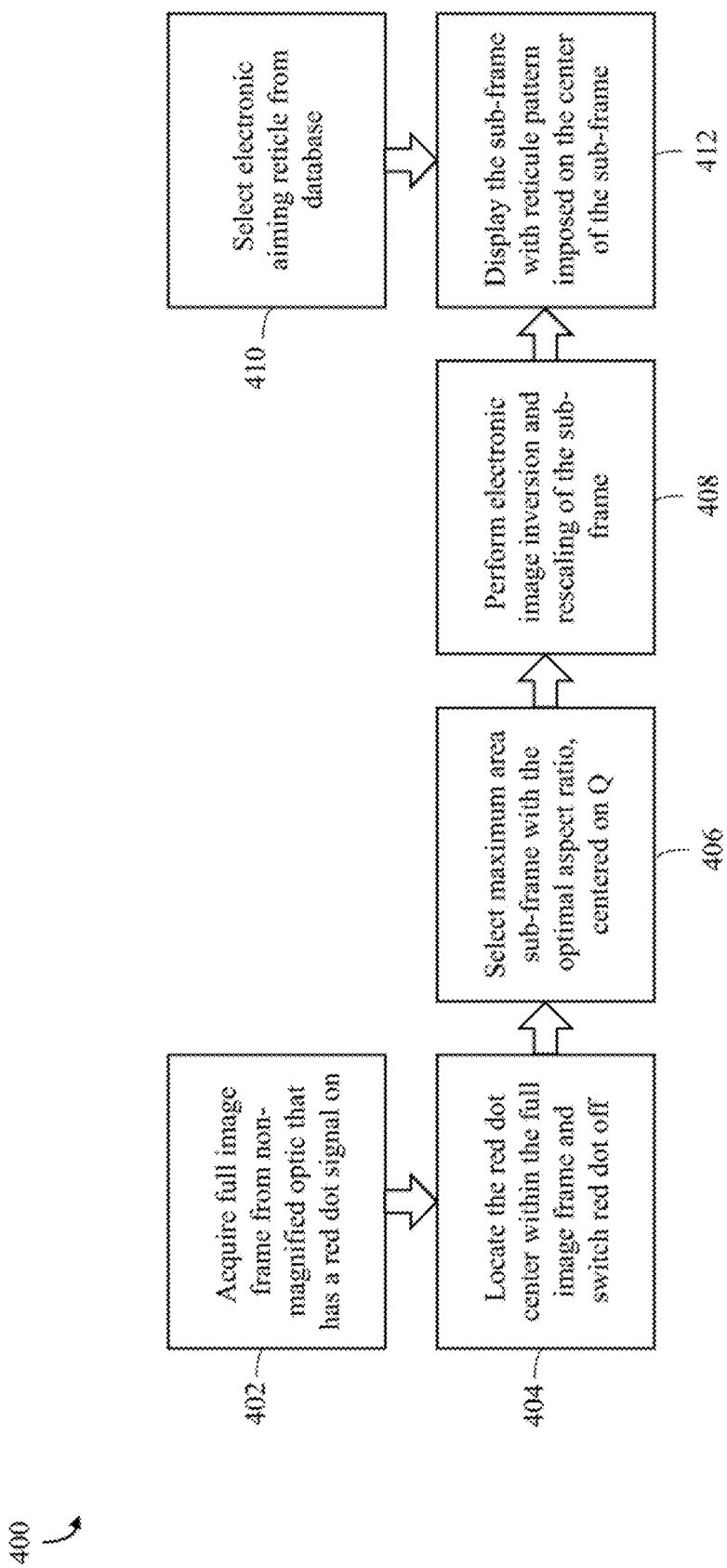
FIG. 4 is a flowchart showing an implementation of a method for centering an aiming reticle using the digital booster of FIG. 1

FIG. 4 is a flowchart showing an implementation of a method for centering an aiming reticle using the digital booster 100 as described herein. First, an image acquisition unit 110 acquires an image frame from a non-magnified, 1× optic where the image frame includes an aiming reticle, such as a red dot, imposed by the non-magnified, 1× optic 402. A processor 112 thereafter locates the red dot center, point Q of the image frame for example, and turns the red dot off 404. The processor 112 selects a maximum area sub-frame with an optimal aspect ratio that is centered on point Q 406. The processor 112 performs electronic image inversion and rescaling of the sub-frame 408. The processor 112 selects an electronic aiming reticle pattern from a database 410. The processor 112 displays the sub-frame with the electronic aiming reticle imposed on the center of the sub-frame 412.

FIG. 5A and FIG. 5B show a conventional eyepiece 504 configuration and method of use for visual optical instruments that have a reticle 502 pattern and exit pupil 506. The reticle 502 is positioned in a conventional optical system 500, imposed by, for example, a conventional magnified optic. The reticle 502 is in disposed in the focal plane of the eyepiece 504, such that the reticle belongs to the eyepiece. For example, a thin glass plate with etched cross or grid is placed in the focal plane of the eyepiece 504.

The conventional optical system 500 forms an exit pupil 506 and collimated beams 508. In practice, a user must position their eye 510 at the position of the exit pupil 506 such that the exit pupil 506 of the visual optical instrument and a pupil of the eye 510 approximately coincide.

Figure 6:
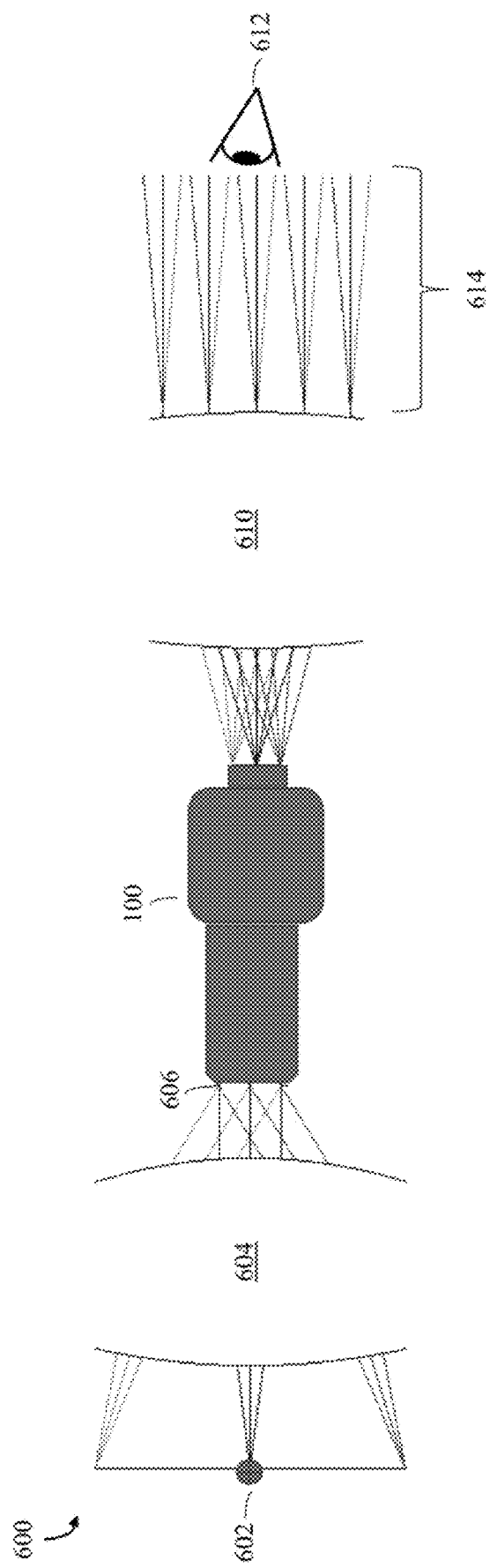
FIG. 6 shows an implementation of the digital booster of FIG. 1 employed in a conventional optical system.

FIG. 6 shows an implementation of the digital booster 100 of FIG. 1 employed in optical system 600, such as for example a firearm, telescope, microscope, or medical imaging device. The optical system 600 includes a reticle 602 imposed by a magnified optic, aligned in succession with an eyepiece 604. The eyepiece 604 may create an exit pupil 606.

The digital booster 100 approximately coincides with the exit pupil 606. The digital booster 100 may include all or a portion of the components as described with reference to the digital booster of FIG. 1. The digital booster 100 may be disposed upstream of eyepiece 610 along an optical axis. The eyepiece 610 may include a flat-field eyepiece. Through use of the digital booster 100, there is no exit pupil in eye space 614. As such, the optical system 600 employing the digital booster 100 includes an unrestricted eyebox and eye relief. A user may view a target comfortably with unrestricted viewing. The optical system 600 does not necessitate precise alignment of the digital booster 100 due to electronic centering of the reticle 602 as explained with reference to FIG. 3A and FIG. 3B.

Figure 7:
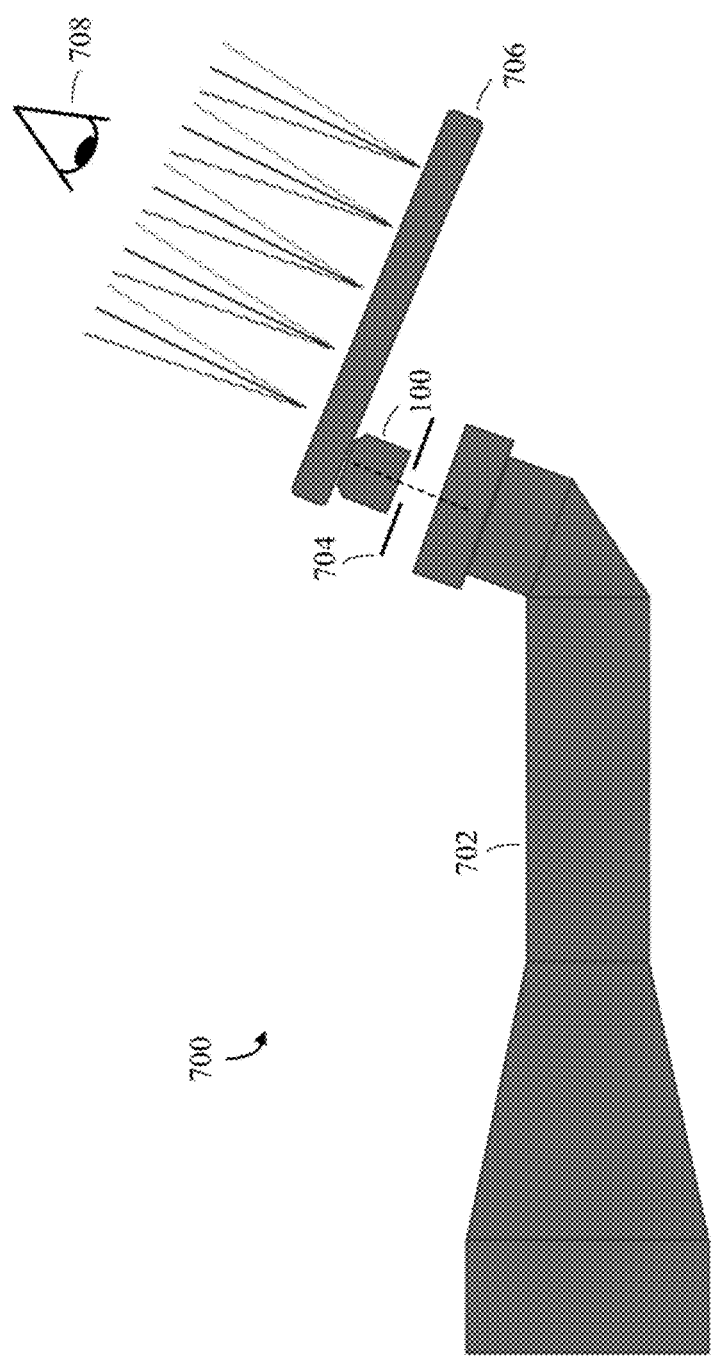
FIG. 7 shows an implementation of the digital booster of FIG. 1 adapted to function with a spotting scope and a smart phone.

FIG. 7 shows an implementation of the digital booster 100 of FIG. 1 employed within a smart phone 706, aligned with a spotting scope 702. The spotting scope 702 may acquire an image of a target and project an image of the target together with an imposed reticle at an exit pupil 704. The digital booster 100 may approximately coincide with the exit pupil 704 of the spotting scope 702. A smartphone 706 may be disposed adjacent to the digital booster 100, the smartphone 706 may include the digital booster 100 itself, or the digital booster 100 may serve as an application on the smartphone 702. The smartphone 702 may include software enabling the digital booster 100 as an adapter for example. Since the diagonal of a typical smartphone 702 screen is larger than a microdisplay, a flat-field eyepiece is not necessitated by the current implementation. The smartphone 702 may include a multi-band sensor array such as multiband zoom optics 106 and a multiband focal plane array 108. The optical system 700 employing the digital booster 100 includes an unrestricted eyebox and eye relief. In this implementation, a user may view a target comfortably with unrestricted viewing. The optical system 700 does not necessitate precise alignment of the digital booster 100 due to electronic centering as explained with reference to FIG. 3A and FIG. 3B.

Figure 8:
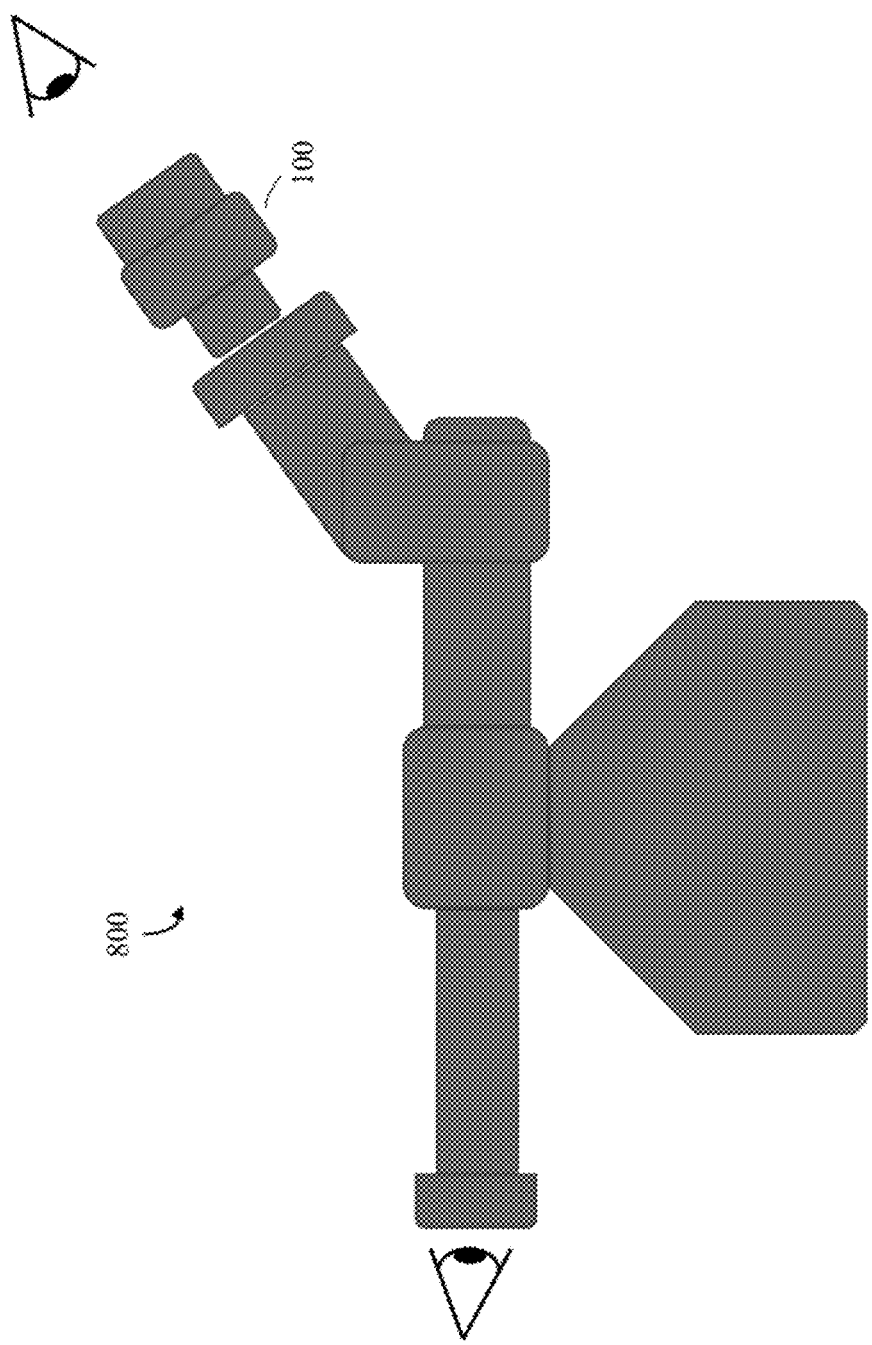
FIG. 8 shows an implementation of the digital booster of FIG. 1 adapted to function with a fundus camera.

FIG. 8 shows an implementation of the digital booster 100 of FIG. 1 adapted to function with a fundus camera 800. The digital booster 100 provides an unrestricted eyebox for convenient viewing and controlling the alignment of a patient's eye relative to the fundus camera 800.

Figure 9:
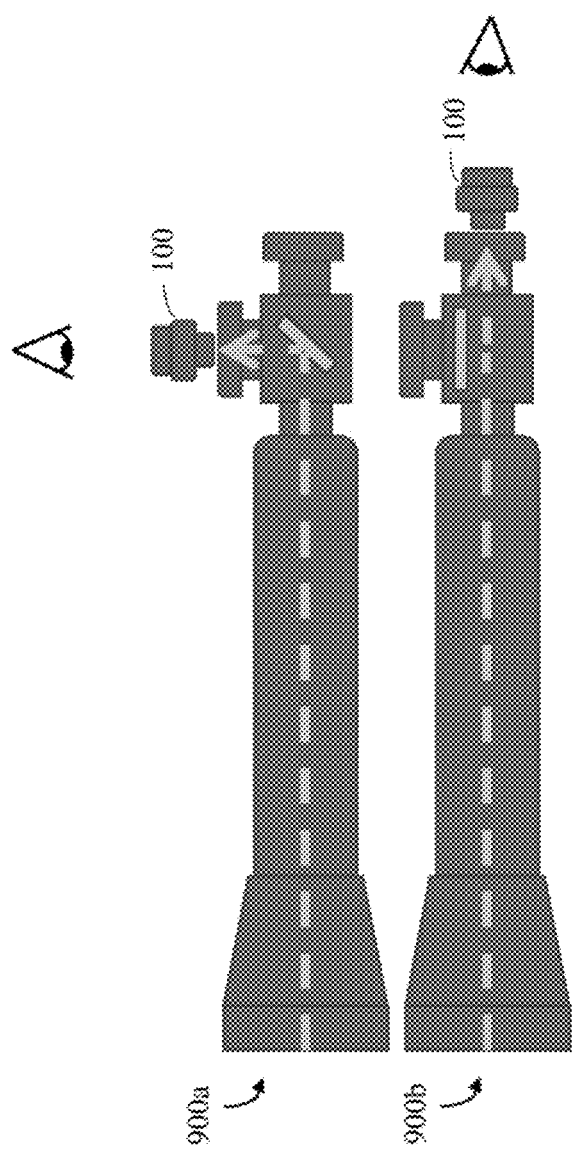
FIG. 9 shows two implementations of the digital booster of FIG. 1 adapted to function with an astronomical refractive telescope.

FIG. 9 shows two implementations of the digital booster 100 of FIG. 1 adapted to function with astronomical refractive telescopes (refractors) 900a, 900b used for terrestrial viewing. Refractors offer very high contrast and clarity of celestial imagery and are perfect for astrophotography. They also double down as powerful terrestrial telescopes but introduce image inversion problems. High performance refractors do not include inversion optics because of image degradation produced by multiple reflections in the prisms employed therein. Frequently a single flip-in fold mirror ("star diagonal") is included within refractors but they erect the image in a vertical direction only. So, the image in such a case is not upside down anymore, but the image is still reversed in the left and right directions.

Digital booster 100 may be employed with a refractor in several different implementations including astronomical refractive telescopes 900a and 900b. The electronic image inversion in digital booster 100 may be disabled when digital booster 100 is adapted to function with astronomical refractive telescope 900a. The digital booster 100 may then invert the incoming, (already inverted) image. Double inversion would produce an erect image. By employing the digital booster 100, there is no need for a prismatic inverter (erector) anymore.

The electronic image inversion in digital booster 100 may be programmed by a user to disable the electronic reversion of an incoming image in a horizontal direction only when digital booster 100 is adapted to function with astronomical refractive telescope 900b. Similar to the implementation of astronomical refractive telescope 900a, double reversion would produce correct horizontal orientation of the final image. In both implementations, the erect image will be observed when using the digital booster 100, plus the convenience of a largely unrestricted eyebox.

Figure 10:
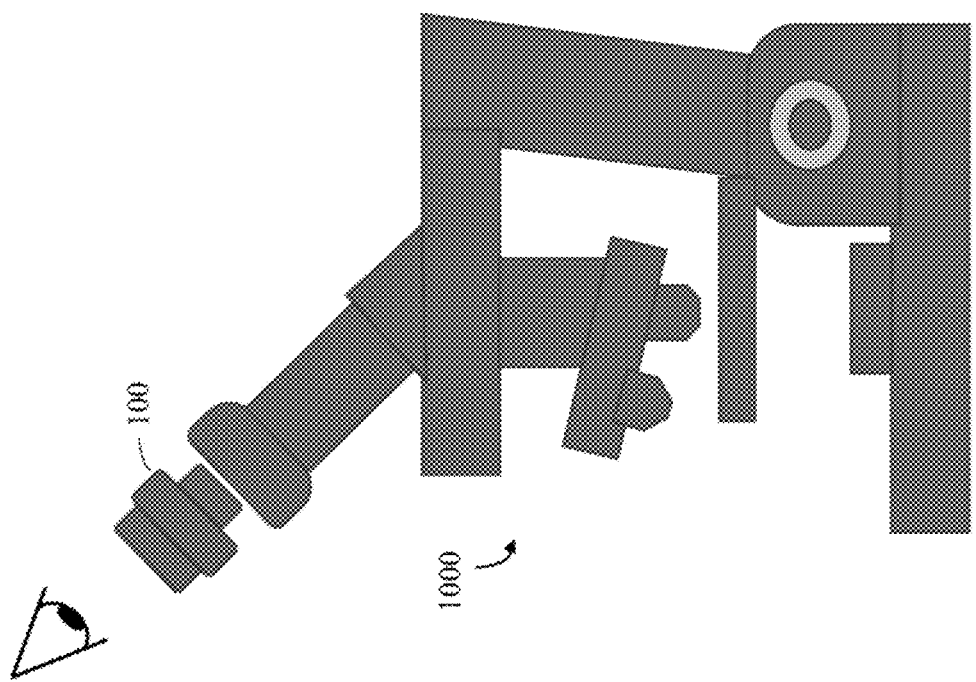
FIG. 10 shows an implementation of the digital booster of FIG. 1 adapted to function with a microscope.

FIG. 10 shows an implementation of the digital booster 100 of FIG. 1 adapted to function with a microscope 1000. The digital booster 100 provides an unrestricted eyebox for convenient viewing, providing effort-free viewing of microscope imagery, which is especially important when required observation time is lengthy.

Figure 11:
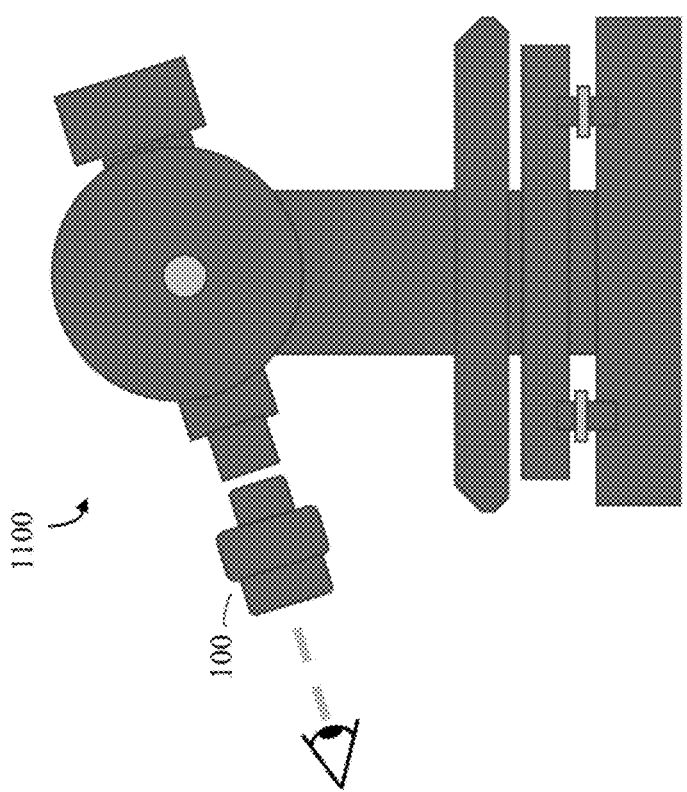
FIG. 11 shows an implementation of the digital booster of FIG. 1 adapted to function with a theodolite.

FIG. 11 shows an implementation of the digital booster 100 of FIG. 1 adapted to function with a theodolite 1100. Theodolites are aiming telescopes configured for very precise metrology of angles. Riflescopes are also aiming telescopes, but less precise than theodolites. Because of high magnification, conventional theodolites have extremely small exit pupils (<2 mm), small eye relief, and a very restricted eyebox. When aligned with the exit pupil of the theodolite 1100, digital booster 100 offers a virtually unrestricted eyebox and eye relief, so visual ergonomics is greatly improved.

Figure 12:
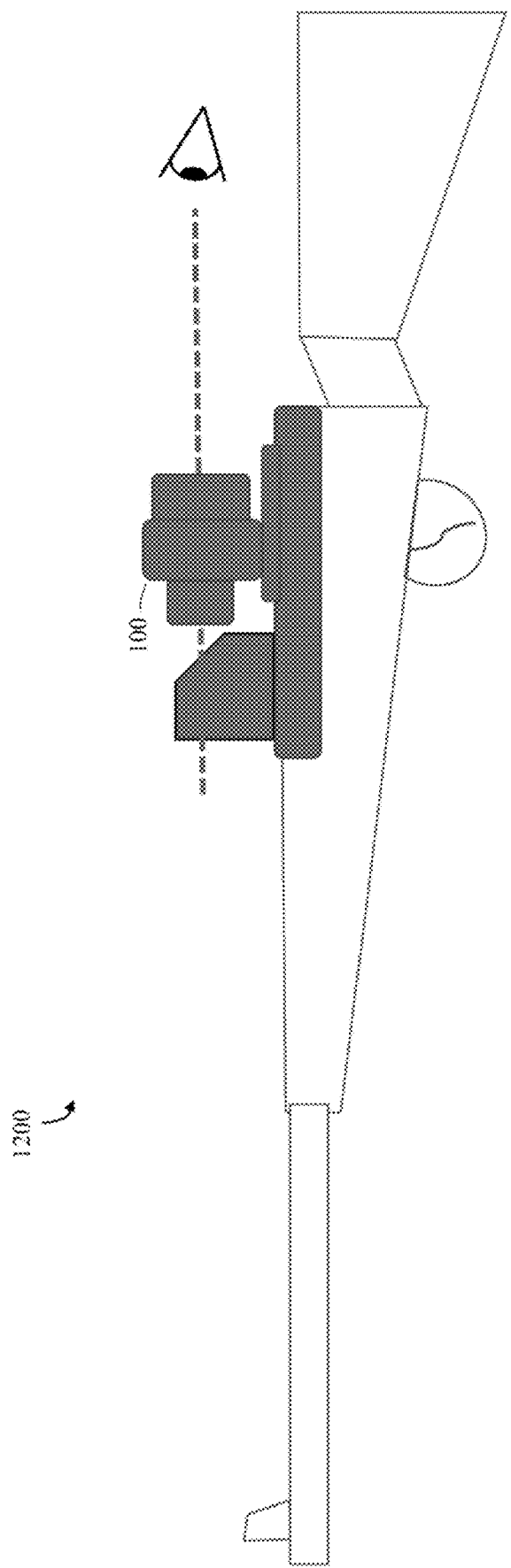
FIG. 12 shows an implementation of the digital booster of FIG. 1 adapted to function with a firearm.

FIG. 12 shows an implementation of the digital booster 100 of FIG. 1 adapted to function with a firearm 1200. The digital booster 100 retains the aiming direction of the nonmagnified sight and provides, due to an unrestricted eyebox, effort-free viewing of magnified target imagery, which is especially useful for long-range shooting.

Many conventional eyepieces have a large apparent field-of-view; short eye relief, i.e., the distance between the last lens of the eyepiece and the exit pupil; and a small diameter exit pupil. For example, a conventional optical theodolite has an exit pupil diameter of about 2 mm or even less. Other examples of instruments having short, restricted eye relief (less than 15 mm) and tight, restricted eyeboxes, include conventional metrological microscopes, biomedical microscopes, spotting scopes for wildlife observation, and spotting scopes for astronomy. Tight eyeboxes yield poor visual ergonomics. In this regard, users may get tired easily, especially when the eye must be engaged for a longer time. The subject technology circumvents these issues.

The subject technology provides an electronic aiming reticle, which may be selected or preprogrammed by a user, on-the-fly zeroing of the digital booster with respect to a non-magnified optic, unrestricted eye relief with a large eye box, enhanced vision in poor light and weather, and additional perturbed reticle generation when rangefinder and ballistic data are known. The subject technology may embody compact and lightweight implementations due to elimination of prism clusters, internal zeroing mechanisms, and through the use of miniature field programmable arrays, micro-displays, eyepieces, and optical zooms. Image acquisition units described herein also accommodate a variety of non-magnified optics and magnifications/FOVs not available with conventional magnifiers.

The subject technology provides non-magnified or magnified electronic images of a target to a user without the necessity to mechanically flip a booster along the optical axis. This is because a properly designed optical zoom in the image acquisition unit will provide both nonmagnified and magnified imagery as needed by the user. This enables fast and easy transition from shooting with both eyes open at short distance to large range shooting.

Elements, equations, or steps of different implementations described may be combined to form other implementations not specifically set forth previously. Elements, equations, or steps may be left out of the digital booster or processes described previously without adversely affecting their operation or the operation of the digital booster in general. Furthermore, various separate elements, equations, or steps may be combined into one or more individual elements or steps to perform the functions described in this specification. It should be understood by one skilled in the art that equations set forth herein may be otherwise expressed in a different form or manner with different underlying assumptions, thus not specifically set forth.

Other implementations not specifically described in this specification are also within the scope of the following claims.

What is claimed is:

1. A digital booster for an optical system comprising:
   an image acquisition unit configured to acquire an image frame from a non-magnified optic, wherein the image frame includes an aiming reticle imposed by the non-magnified optic;
   a display; and
   a processor configured to:
      locate the aiming reticle on the image frame;
      select a sub-frame of the image frame with an aspect ratio that is centered on the aiming reticle of the image frame;
      perform image inversion and rescaling of the sub-frame;
      transmit the sub-frame to the display.

2. The digital booster of claim 1, further comprising a database of electronic reticle patterns, wherein the processor is further configured to select an electronic aiming reticle from the database and impose the electronic aiming reticle onto the sub-frame.

3. The digital booster of claim 1, further comprising a monocular housing in which the image acquisition unit, display, and processor are disposed within.

4. The digital booster of claim 1, further comprising multiband zoom optics disposed between the image acquisition unit and the non-magnified optic.

5. The digital booster of claim 4, further comprising a multiband focal plane array in electronic communication with the image acquisition unit to enable the image acquisition unit to acquire the image frame in one or more of the following electromagnetic bands: visible, near infrared, and short wave infrared.

6. The digital booster of claim 1, wherein the processor is further configured to turn off the aiming reticle imposed by the non-magnified optic after locating the aiming reticle on the image frame.

7. The digital booster of claim 6, wherein the image acquisition unit is configured to magnify the image frame or sub-frame such as to provide zooming capability.

8. The digital booster of claim 1, wherein the processor is further configured to select a sub-frame based on having a maximum area sub-frame and based on attributes of the display.

9. The digital booster of claim 1, wherein the digital booster is adapted to function with one or more of the following apparatuses: a firearm, a cell phone, telescope, microscope, or medical imaging device.

10. A method for centering an aiming reticle comprising:
    acquiring, from an image acquisition unit, an image frame from a non-magnified optic, wherein the image frame includes an aiming reticle imposed by the non-magnified optic;
    locating, with a processor, the aiming reticle on the image frame;
    selecting, with the processor, a sub-frame of the image frame with an aspect ratio that is centered on the aiming reticle of the image frame;
    performing, with the processor, image inversion and rescaling of the sub-frame; and
    displaying the sub-frame.

11. The method of claim 10, further comprising selecting an electronic aiming reticle from a database and imposing the electronic aiming reticle onto the sub-frame.

12. The method of claim 10, further comprising employing a multiband focal plane array and multiband zoom optics to enable the image acquisition unit to acquire the image frame in one or more of the following electromagnetic bands: visible, near infrared, and short wave infrared.

13. The method of claim 10, further comprising turning off, with the processor, the aiming reticle imposed by the non-magnified optic after locating the aiming reticle on the image frame.

14. The method of claim 10, further comprising magnifying the image frame or sub-frame such as to provide zooming capability.

15. The method of claim 10, wherein selecting, with the processor, a sub-frame of the image frame is based on attributes of display.

16. The method of claim 10, wherein selecting, with the processor, a sub-frame of the image frame is based on maximizing the area of the sub-frame.

17. The method of claim 10, further comprising checking the location of the aiming reticle on the image frame by turning on, with the processor, the aiming reticle imposed by the non-magnified optic, and repeating the locating of the aiming reticle on the image frame.

18. The method of claim 10, further comprising generating a perturbed reticle onto the sub-frame.

19. The method of claim 10, further comprising operating the image acquisition unit and the processor with one or more of the follow apparatuses: a firearm, a cell phone, telescope, microscope, or medical imaging device.

20. A digital booster for a firearm comprising:
    a monocular housing defined by a flat-field eyepiece, the monocular housing configured to rotate in alignment with a non-magnified optic and a trajectory of the firearm;
    an image acquisition unit disposed within the monocular housing, the image acquisition unit configured to acquire an image frame from the non-magnified optic, wherein the image frame includes an aiming reticle imposed by the non-magnified optic;
    a display situated adjacent the flat-field eyepiece within the monocular housing; and a processor disposed within the monocular housing configured to:
  locate the aiming reticle on the image frame;
  select a sub-frame of the image frame with an aspect ratio that is centered on the aiming reticle of the image frame;
  perform image inversion and rescaling of the sub-frame; and
  transmit the sub-frame to the display.

* * * * *